(12) United States Patent
Chirca (10) Patent No.: US 11,573,802 B2
(45) Date of Patent: Feb. 7, 2023

(54) USER MODE EVENT HANDLING

(71) Applicant: TEXAS INSTRUMENTS INCORPORATED, Dallas, TX (US)

(72) Inventor: Kai Chirca, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 65 days.

(21) Appl. No.: 17/079,038

(22) Filed: Oct. 23, 2020

(65) Prior Publication Data

US 2021/0124607 A1    Apr. 29, 2021

Related U.S. Application Data

(60) Provisional application No. 62/924,794, filed on Oct. 23, 2019.

(51) Int. Cl.
| | |
|---|---|
| *G06F 9/38* | (2018.01) |
| *G06F 9/54* | (2006.01) |
| *G06F 11/36* | (2006.01) |
| *G06F 9/30* | (2018.01) |
| *G06F 9/48* | (2006.01) |

(52) U.S. Cl.
CPC ........ *G06F 9/3867* (2013.01); *G06F 9/30101* (2013.01); *G06F 9/30116* (2013.01); *G06F 9/3853* (2013.01); *G06F 9/3857* (2013.01); *G06F 9/3861* (2013.01); *G06F 9/3863* (2013.01); *G06F 9/4812* (2013.01); *G06F 9/4843* (2013.01); *G06F 9/542* (2013.01); *G06F 9/544* (2013.01); *G06F 11/368* (2013.01); *G06F 11/3696* (2013.01)

(58) Field of Classification Search
CPC ............... G06F 9/3867; G06F 9/30101; G06F 9/30116; G06F 9/3853; G06F 9/3857; G06F 9/3861; G06F 9/3863; G06F 9/4812; G06F 9/4843; G06F 9/542; G06F 9/544; G06F 11/368; G06F 11/3696
See application file for complete search history.

(56) References Cited

U.S. PATENT DOCUMENTS

| | | | | |
|---|---|---|---|---|
| 5,495,615 | A * | 2/1996 | Nizar | G06F 15/17 710/266 |
| 6,658,514 | B1 * | 12/2003 | Jones | G06F 13/385 710/260 |
| 2020/0371935 | A1 * | 11/2020 | Chachad | G06F 12/0871 |

FOREIGN PATENT DOCUMENTS

WO    WO-0142914 A1 *    6/2001    ........... G06F 9/3009

* cited by examiner

*Primary Examiner* — Henry Tsai
*Assistant Examiner* — John B Roche
(74) *Attorney, Agent, or Firm* — Brian D. Graham; Frank D. Cimino (57) ABSTRACT

A method includes asserting a field of an event flag mask register configured to inhibit an event handler. The method also includes, responsive to an event that corresponds to the field of the event flag mask register being triggered: asserting a field of an event flag register associated with the event; and based the field in the event flag register being asserted, taking an action by a task being executed by the data processor core.

19 Claims, 6 Drawing Sheets

USER MODE EVENT HANDLING

CROSS-REFERENCE TO RELATED APPLICATIONS

The present application claims priority to U.S. Provisional Patent Application No. 62/924,794, which was filed Oct. 23, 2019, is titled "DSP Architecture," and is hereby incorporated herein by reference in its entirety.

BACKGROUND

Exceptions and interrupts refer to events that occur outside the normal flow of execution of one or more instructions by a processor core and have the potential to disrupt the executing instructions. Exceptions include events, often unexpected, that are generated within the processor. Interrupts include events, also often unexpected, that are generated outside of the processor.

SUMMARY

In accordance with at least one example of this description, a method includes asserting a field of an event flag mask register configured to inhibit an event handler. The method also includes, responsive to an event that corresponds to the field of the event flag mask register being triggered: asserting a field of an event flag register associated with the event; and based the field in the event flag register being asserted, taking an action by a task being executed by the data processor core.

In accordance with another example of this description, a method includes receiving a request, from a supervisor task executed by a data processor core, to assert a field of an event flag mask register; responsive to the request from the supervisor task, asserting the field of the event flag mask register; responsive to an event being triggered, asserting a field of an event flag register associated with the event; receiving a request from a user task executed by the data processor core to clear the asserted field of the event flag mask register; responsive to the field of the event flag register corresponding to the asserted field of the event flag mask register, clearing the asserted field of the event flag mask register; and responsive to the field of the event flag register not corresponding to the asserted field of the event flag mask register, not clearing the asserted field of the event flag mask register.

In accordance with yet another example of this description, a system includes a data processor and an event controller coupled to the data processor. The event controller includes an event flag mask register having a plurality of fields each configured to inhibit an event handler and an event flag register having a plurality of fields. Each one of the plurality of fields of the event flag register corresponds to one of the plurality of fields of the event flag mask register. The event controller is configured to receive a request from a supervisor task to assert a field of the event flag mask register; responsive to the request from the supervisor task, assert the field of the event flag mask register; responsive to an event being triggered, assert a field of the event flag register associated with the event; receive a request from a user task to clear the field of the event flag register; responsive to the field of the event flag register corresponding to the asserted field of the event flag mask register, clear the field of the event flag register; and responsive to the field of the event flag register not corresponding to the asserted field of the event flag mask register, not clear the field of the event flag register.

BRIEF DESCRIPTION OF THE DRAWINGS

For a detailed description of various examples, reference will now be made to the accompanying drawings in which.

DETAILED DESCRIPTION

The completion of a data movement or data processing operation can be signaled, such as to a task being executed by a processor core, by triggering an event (e.g., an exception or an interrupt). Responsive to such an event being handled, the task is configured to begin operating on the available data (e.g., the data resulting from the data movement or data processing operation). However, in many cases, interrupting the task to launch an event handler to handle an event is a time-consuming process (e.g., on the order of 100 or more clock cycles).

In order to address the foregoing, examples of this description are directed to disabling an event (e.g., preventing the event from interrupting a currently running user task to launch an event handler task) that is associated with the completion of such a data movement or data processing operation. Thus, the switch to the event handler task may be delayed or the user task may take action based on the event without the use of an event handler task. In some examples, only a supervisor-level task (a "supervisor task") is permitted to disable an event, to safeguard against lower, user-level tasks from having access to such functionality. In addition to disabling the event, the supervisor task also asserts a field in an event flag mask register, which grants a user task the ability to read and clear a corresponding field in an event flag register. The asserted field in the event flag mask register and the corresponding field in the event flag register are associated with the disabled event.

When such an event occurs, the event may not be immediately handled by an event handler task due to the event having been disabled by the supervisor task; however, the field in the event flag register is asserted, indicating the occurrence of the event to the user task. The user task is configured to poll (e.g., read) the associated field in the event flag register to determine whether the data movement or data processing operation is complete without the overhead of having to handle the event. For example, when the associated field in the event flag register is asserted, this indicates to the user task that the data movement or data processing operation is complete. Responsive to the indication that the data movement or data processing operation is complete, the user task is thus configured to begin operating on the resulting data, Additionally, the user task is also configured to clear the field in the event flag register should the supervisor task grant such permission by asserting the corresponding field in the event flag mask register.

As a result, the user task is configured to determine when the data movement or data processing operation is complete (e.g., by polling the field in the event flag register) while avoiding the overhead associated with handling such an event using an event handler task. The user task then begins to operate on the data resulting from the data movement or data processing operation. Further, the user task is configured to clear the field in the event flag register because the supervisor task has granted such permission by asserting the corresponding field in the event flag mask register. However, by not asserting certain other fields in the event flag mask register, the supervisor task is able to restrict the user task from inadvertently clearing an event flag for which the user task does not have permission. These and other examples of this description are described in further detail below.

Figure 1:
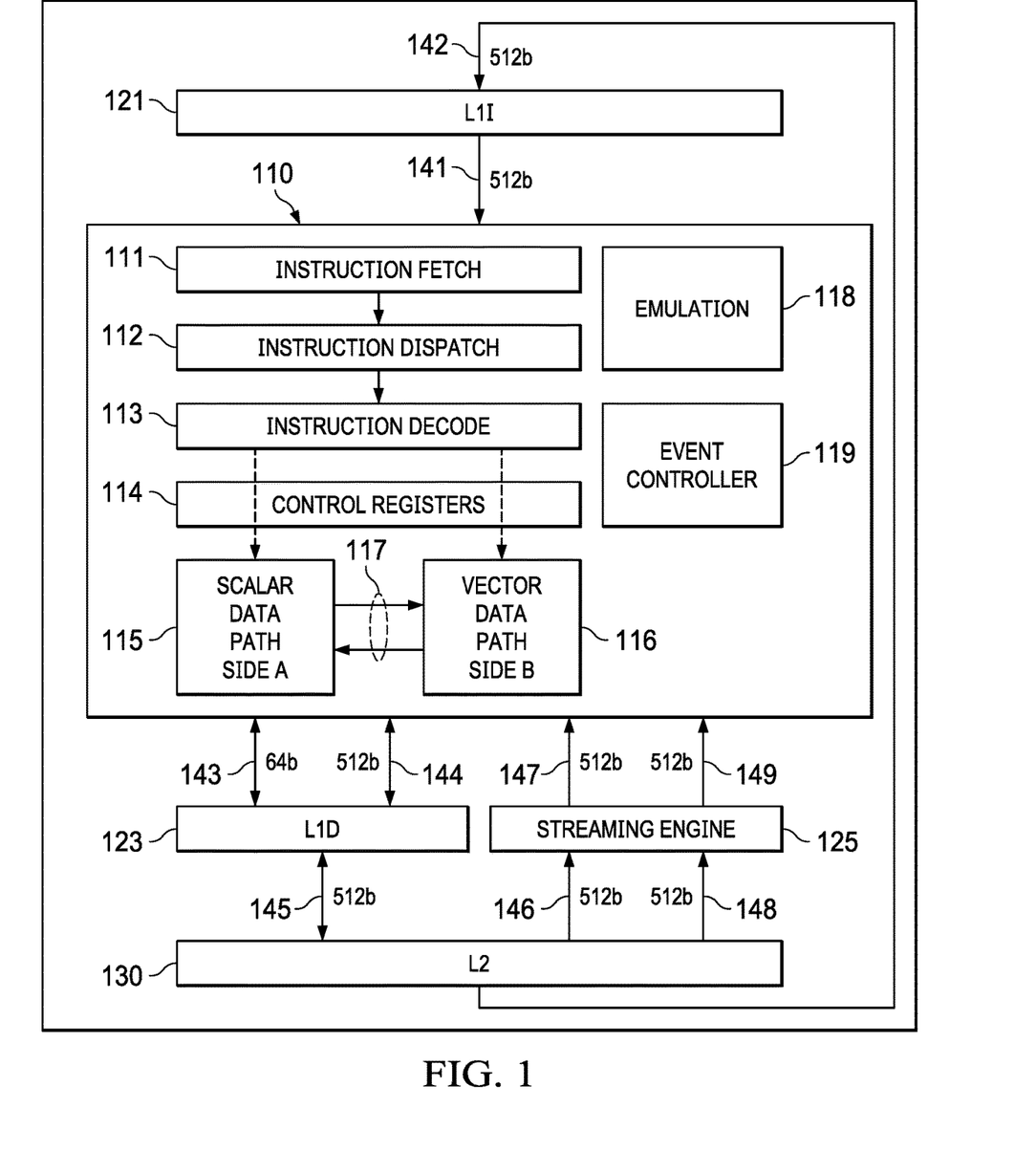
FIG. 1 is a block diagram of a dual scalar/vector datapath processor in accordance with various examples.

FIG. 1 is a block diagram a dual scalar/vector datapath processor 100 in accordance with an example of this description. Processor 100 includes separate level one instruction cache (L1I) 121 and level one data cache (L1D) 123. Processor 100 includes a level two combined instruction/data cache (L2) 130 that holds both instructions and data. FIG. 1 shows a connection between level one instruction cache 121 and level two combined instruction/data cache 130 (bus 142). FIG. 1 also shows connection between level one data cache 123 and level two combined instruction/data cache 130 (bus 145). In an example, processor 100 level two combined instruction/data cache 130 stores both instructions to back up level one instruction cache 121 and data to back up level one data cache 123. In this example, level two combined instruction/data cache 130 is further connected to higher level cache and/or main memory. In this example, central processing unit core 110, level one instruction cache 121, level one data cache 123 and level two combined instruction/data cache 130 are formed on a single integrated circuit. This signal integrated circuit optionally includes other circuits.

Central processing unit core 110 fetches instructions from level one instruction cache 121 as controlled by instruction fetch unit 111. Instruction fetch unit 111 determines the next instructions to be executed and recalls a fetch packet sized set of such instructions. The nature and size of fetch packets are further detailed below. In some cases, instructions are directly fetched from level one instruction cache 121 upon a cache hit (if these instructions are stored in level one instruction cache 121). Upon a cache miss (the specified instruction fetch packet is not stored in level one instruction cache 121), these instructions are sought in level two combined cache 130. In this example, the size of a cache line in level one instruction cache 121 equals the size of a fetch packet. The memory locations of these instructions are either a hit in level two combined cache 130 or a miss. A hit is serviced from level two combined cache 130. A miss is serviced from a higher level of cache or from main memory. In some cases, the requested instruction is simultaneously supplied to both level one instruction cache 121 and central processing unit core 110 to speed use.

In an example, central processing unit core 110 includes plural functional units to perform instruction specified data processing tasks. Instruction dispatch unit 112 determines the target functional unit of each fetched instruction. In this example, central processing unit 110 operates as a very long instruction word (VLIW) processor capable of operating on plural instructions in corresponding functional units simultaneously. Preferably a complier organizes instructions in execute packets that are executed together. Instruction dispatch unit 112 directs each instruction to its target functional unit. The functional unit assigned to an instruction is completely specified by the instruction produced by a compiler. The hardware of central processing unit core 110 has no part in this functional unit assignment. In this example, instruction dispatch unit 112 is configured to operate on plural instructions in parallel. The number of such parallel instructions is set by the size of the execute packet, as explained further below.

One part of the dispatch task of instruction dispatch unit 112 is determining whether the instruction is to execute on a functional unit in scalar datapath side A 115 or vector datapath side B 116. An instruction bit within each instruction called the s bit determines which datapath the instruction controls. This will be further detailed below.

Instruction decode unit 113 decodes each instruction in a current execute packet. Decoding includes identification of the functional unit performing the instruction, identification of registers used to supply data for the corresponding data processing operation from among possible register files and identification of the register destination of the results of the corresponding data processing operation. As explained further below, in some examples, instructions include a constant field in place of one register number operand field. The result of this decoding is signals for control of the target functional unit to perform the data processing operation specified by the corresponding instruction on the specified data.

Central processing unit core 110 includes control registers 114. Control registers 114 store information for control of the functional units in scalar datapath side A 115 and vector datapath side B 116. This information could be mode information or the like.

The decoded instructions from instruction decode 113 and information stored in control registers 114 are supplied to scalar datapath side A 115 and vector datapath side B 116. As a result functional units within scalar datapath side A 115 and vector datapath side B 116 perform instruction specified data processing operations upon instruction specified data and store the results in an instruction specified data register or registers. Each of scalar datapath side A 115 and vector datapath side B 116 includes plural functional units that preferably operate in parallel. These will be further detailed below in conjunction with FIG. 2. There is a datapath 117 between scalar datapath side A 115 and vector datapath side B 116 permitting data exchange.

Central processing unit core 110 includes further non-instruction based modules. Emulation unit 118 permits determination of the machine state of central processing unit core 110 in response to instructions. This capability may be employed for algorithmic development. Event controller 119 is a unit that enables central processing unit core 110 to be responsive to external, asynchronous events (interrupts) and to respond to attempts to perform improper operations (exceptions).

Central processing unit core 110 includes streaming engine 125. Streaming engine 125 of this example supplies two data streams from predetermined addresses typically cached in level two combined cache 130 to register files of vector datapath side B 116. This provides controlled data movement from memory (as cached in level two combined cache 130) directly to functional unit operand inputs. This is further detailed below.

FIG. 1 includes exemplary data widths of busses between various parts. Level one instruction cache 121 supplies instructions to instruction fetch unit 111 via bus 141. Bus 141 is preferably a 512-bit bus. Bus 141 is unidirectional from level one instruction cache 121 to central processing unit 110. Level two combined cache 130 supplies instructions to level one instruction cache 121 via bus 142. Bus 142 is preferably a 512-bit bus. Bus 142 is unidirectional from level two combined cache 130 to level one instruction cache 121.

Level one data cache 123 exchanges data with register files in scalar datapath side A 115 via bus 143. Bus 143 is preferably a 64-bit bus. Level one data cache 123 exchanges data with register files in vector datapath side B 116 via bus 144. Bus 144 is preferably a 512-bit bus. Busses 143 and 144 are shown as bidirectional supporting both central processing unit 110 data reads and data writes. Level one data cache 123 exchanges data with level two combined cache 130 via bus 145. Bus 145 is preferably a 512-bit bus. Bus 145 is shown as bidirectional supporting cache service for both central processing unit 110 data reads and data writes.

In some cases, CPU data requests are directly fetched from level one data cache 123 upon a cache hit (if the requested data is stored in level one data cache 123). Upon a cache miss (the specified data is not stored in level one data cache 123), this data is sought in level two combined cache 130. The memory locations of this requested data is either a hit in level two combined cache 130 or a miss. A hit is serviced from level two combined cache 130. A miss is serviced from another level of cache or from main memory. In some cases, the requested instruction is simultaneously supplied to both level one data cache 123 and central processing unit core 110 to speed use.

Level two combined cache 130 supplies data of a first data stream to streaming engine 125 via bus 146. Bus 146 is preferably a 512-bit bus. Streaming engine 125 supplies data of this first data stream to functional units of vector datapath side B 116 via bus 147. Bus 147 is preferably a 512-bit bus. Level two combined cache 130 supplies data of a second data stream to streaming engine 125 via bus 148. Bus 148 is preferably a 512-bit bus. Streaming engine 125 supplies data of this second data stream to functional units of vector datapath side B 116 via bus 149. Bus 149 is preferably a 512-bit bus. Busses 146, 147, 148 and 149 are shown as unidirectional from level two combined cache 130 to streaming engine 125 and to vector datapath side B 116 in accordance with various examples of this description.

Streaming engine 125 data requests are directly fetched from level two combined cache 130 upon a cache hit (if the requested data is stored in level two combined cache 130). Upon a cache miss (the specified data is not stored in level two combined cache 130), this data is sought from another level of cache or from main memory. It is technically feasible in some examples for level one data cache 123 to cache data not stored in level two combined cache 130. If such operation is supported, then upon a streaming engine 125 data request that is a miss in level two combined cache 130, level two combined cache 130 should snoop level one data cache 123 for the stream engine 125 requested data. If level one data cache 123 stores this data, its snoop response would include the data, which is then supplied to service the streaming engine 125 request. If level one data cache 123 does not store this data, its snoop response would indicate this and level two combined cache 130 must service this streaming engine 125 request from another level of cache or from main memory.

In an example, both the level one data cache 123 and the level two combined cache 130 may be configured as selected amounts of cache or directly addressable memory in accordance with U.S. Pat. No. 6,606,686 entitled UNIFIED MEMORY SYSTEM ARCHITECTURE INCLUDING CACHE AND DIRECTLY ADDRESSABLE STATIC RANDOM ACCESS MEMORY.

Figure 2:
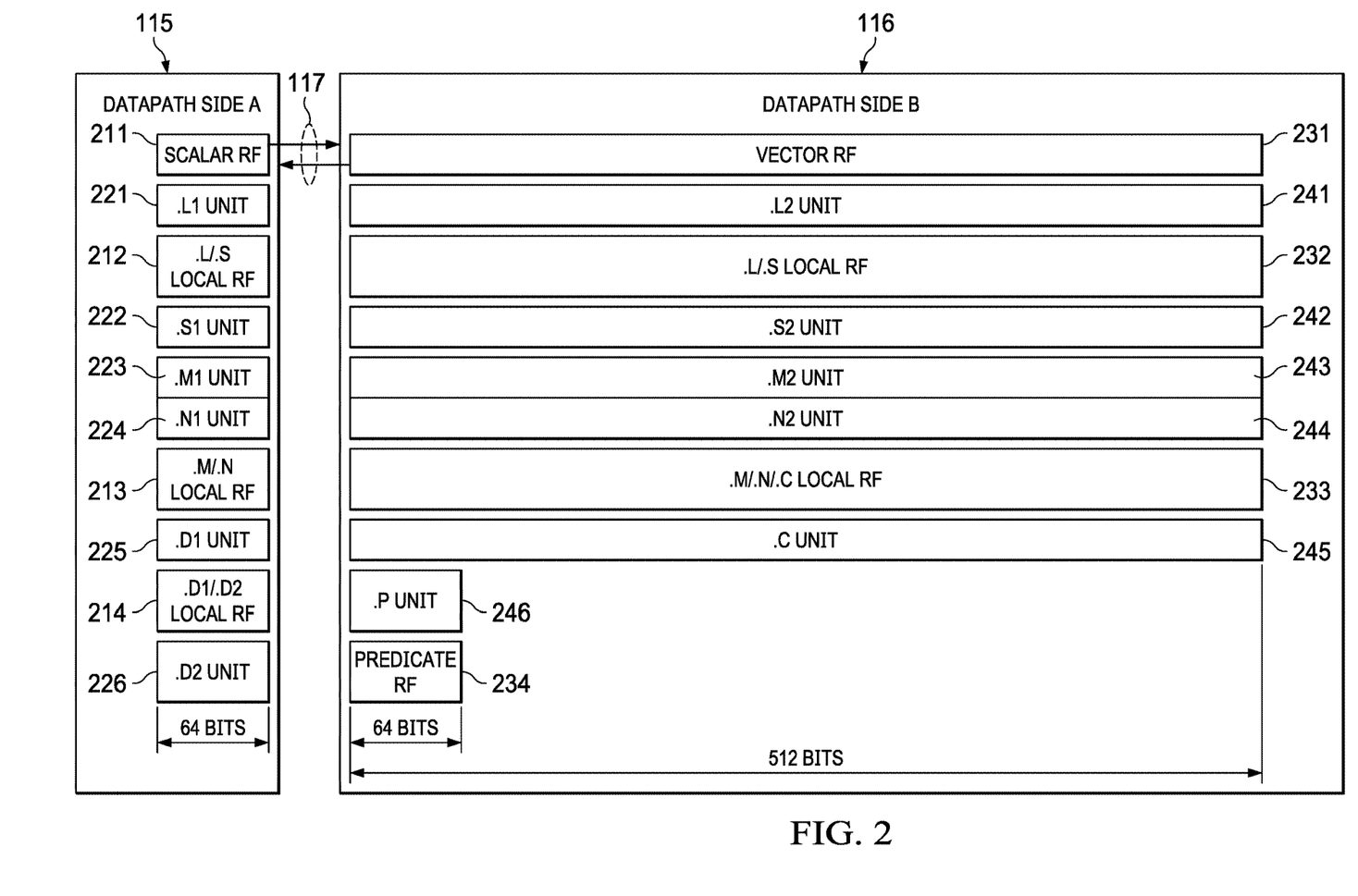
FIG. 2 is a block diagram of registers and functional units in the dual scalar/vector datapath processor illustrated in FIG. 1 and in accordance with various examples.

FIG. 2 is a block diagram that includes further details of functional units and register files within scalar datapath side A 115 and vector datapath side B 116. Scalar datapath side A 115 includes global scalar register file 211, L1/S1 local register file 212, M1/N1 local register file 213 and D1/D2 local register file 214. Scalar datapath side A 115 includes L1 unit 221, S1 unit 222, M1 unit 223, N1 unit 224, D1 unit 225 and D2 unit 226. Vector datapath side B 116 includes global vector register file 231, L2/S2 local register file 232, M2/N2/C local register file 233 and predicate register file 234. Vector datapath side B 116 includes L2 unit 241, S2 unit 242, M2 unit 243, N2 unit 244, C unit 245 and P unit 246. There are limitations upon which functional units are permitted to read from or write to which register files. These will be detailed below.

Scalar datapath side A 115 includes L1 unit 221. L1 unit 221 generally accepts two 64-bit operands and produces one 64-bit result. The two operands are each recalled from an instruction specified register in either global scalar register file 211 or L1/S1 local register file 212. L1 unit 221 preferably performs the following instruction selected operations: 64-bit add/subtract operations; 32-bit min/max operations; 8-bit Single Instruction Multiple Data (SIMD) instructions such as sum of absolute value, minimum and maximum determinations; circular min/max operations; and various move operations between register files. In some examples, the result is written into an instruction specified register of global scalar register file 211, L1/S1 local register file 212, M1/N1 local register file 213 or D1/D2 local register file 214.

Scalar datapath side A 115 includes S1 unit 222. S1 unit 222 generally accepts two 64-bit operands and produces one 64-bit result. The two operands are each recalled from an instruction specified register in either global scalar register file 211 or L1/S1 local register file 212. S1 unit 222 preferably performs the same type operations as L1 unit 221. There optionally are variations between the data processing operations supported by L1 unit 221 and S1 unit 222. For example, the result can be written into an instruction specified register of global scalar register file 211, L1/S1 local register file 212, M1/N1 local register file 213 or D1/D2 local register file 214.

Scalar datapath side A 115 includes M1 unit 223. M1 unit 223 generally accepts two 64-bit operands and produces one 64-bit result. The two operands are each recalled from an instruction specified register in either global scalar register file 211 or M1/N1 local register file 213. M1 unit 223 preferably performs the following instruction selected operations: 8-bit multiply operations; complex dot product operations; 32-bit bit count operations; complex conjugate multiply operations; and bit-wise Logical Operations, moves, adds and subtracts. The result may be written into an instruction specified register of global scalar register file 211, L1/S1 local register file 212, M1/N1 local register file 213 or D1/D2 local register file 214.

Scalar datapath side A 115 includes N1 unit 224. N1 unit 224 generally accepts two 64-bit operands and produces one 64-bit result. The two operands are each recalled from an instruction specified register in either global scalar register file 211 or M1/N1 local register file 213. N1 unit 224 preferably performs the same type operations as M1 unit 223. There are certain double operations (called dual issued instructions) that employ both the M1 unit 223 and the N1 unit 224 together. In these cases, the result is written into an instruction specified register of global scalar register file 211, L1/S1 local register file 212, M1/N1 local register file 213 or D1/D2 local register file 214.

Scalar datapath side A 115 includes D1 unit 225 and D2 unit 226. D1 unit 225 and D2 unit 226 generally each accept two 64-bit operands and each produce one 64-bit result. D1 unit 225 and D2 unit 226 generally perform address calculations and corresponding load and store operations. D1 unit 225 is used for scalar loads and stores of 64 bits. D2 unit 226 is used for vector loads and stores of 512 bits. D1 unit 225 and D2 unit 226 preferably also perform: swapping, pack and unpack on the load and store data; 64-bit SIMD arithmetic operations; and 64-bit bit-wise logical operations. D1/D2 local register file 214 will generally store base and offset addresses used in address calculations for the corresponding loads and stores. The two operands are each recalled from an instruction specified register in either global scalar register file 211 or D1/D2 local register file 214. The calculated result is written into an instruction specified register of global scalar register file 211, L1/S1 local register file 212, M1/N1 local register file 213 or D1/D2 local register file 214.

Vector datapath side B 116 includes L2 unit 241. L2 unit 241 generally accepts two 512-bit operands and produces one 512-bit result. The two operands are each recalled from an instruction specified register in either global vector register file 231, L2/S2 local register file 232 or predicate register file 234. L2 unit 241 preferably performs instruction similar to L1 unit 221 except on wider 512-bit data. The result is written into an instruction specified register of global vector register file 231, L2/S2 local register file 232, M2/N2/C local register file 233 or predicate register file 234.

Vector datapath side B 116 includes S2 unit 242. S2 unit 242 generally accepts two 512-bit operands and produces one 512-bit result. The two operands are each recalled from an instruction specified register in either global vector register file 231, L2/S2 local register file 232 or predicate register file 234. S2 unit 242 preferably performs instructions similar to S1 unit 222. The result is written into an instruction specified register of global vector register file 231, L2/S2 local register file 232, M2/N2/C local register file 233 or predicate register file 234.

Vector datapath side B 116 includes M2 unit 243. M2 unit 243 generally accepts two 512-bit operands and produces one 512-bit result. The two operands are each recalled from an instruction specified register in either global vector register file 231 or M2/N2/C local register file 233. M2 unit 243 preferably performs instructions similar to M1 unit 223 except on wider 512-bit data. The result is written into an instruction specified register of global vector register file 231, L2/S2 local register file 232 or M2/N2/C local register file 233.

Vector datapath side B 116 includes N2 unit 244. N2 unit 244 generally accepts two 512-bit operands and produces one 512-bit result. The two operands are each recalled from an instruction specified register in either global vector register file 231 or M2/N2/C local register file 233. N2 unit 244 preferably performs the same type operations as M2 unit 243. There are certain double operations (called dual issued instructions) that employ both M2 unit 243 and the N2 unit 244 together. The result is written into an instruction specified register of global vector register file 231, L2/S2 local register file 232 or M2/N2/C local register file 233.

Vector datapath side B 116 includes C unit 245. C unit 245 generally accepts two 512-bit operands and produces one 512-bit result. The two operands are each recalled from an instruction specified register in either global vector register file 231 or M2/N2/C local register file 233. C unit 245 preferably performs: "Rake" and "Search" instructions; up to 512 2-bit PN*8-bit multiplies I/Q complex multiplies per clock cycle; 8-bit and 16-bit Sum-of-Absolute-Difference (SAD) calculations, up to 512 SADs per clock cycle; horizontal add and horizontal min/max instructions; and vector permutes instructions. C unit 245 also contains 4 vector control registers (CUCR0 to CUCR3) used to control certain operations of C unit 245 instructions. Control registers CUCR0 to CUCR3 are used as operands in certain C unit 245 operations. Control registers CUCR0 to CUCR3 are preferably used: in control of a general permutation instruction (VPERM); and as masks for SIMD multiple DOT product operations (DOTPM) and SIMD multiple Sum-of-Absolute-Difference (SAD) operations. Control register CUCR0 is preferably used to store the polynomials for Galois Field Multiply operations (GFMPY). Control register CUCR1 is preferably used to store the Galois field polynomial generator function.

Vector datapath side B 116 includes P unit 246. P unit 246 performs basic logic operations on registers of local predicate register file 234. P unit 246 has direct access to read from and write to predication register file 234. These operations include single register unary operations such as: NEG (negate) which inverts each bit of the single register; BITCNT (bit count) which returns a count of the number of bits in the single register having a predetermined digital state (1 or 0); RMBD (right most bit detect) which returns a number of bit positions from the least significant bit position (right most) to a first bit position having a predetermined digital state (1 or 0); DECIMATE which selects every instruction specified Nth (1, 2, 4, etc.) bit to output; and EXPAND which replicates each bit an instruction specified N times (2, 4, etc.). These operations include two register binary operations such as: AND a bitwise AND of data of the two registers; NAND a bitwise AND and negate of data of the two registers; OR a bitwise OR of data of the two registers; NOR a bitwise OR and negate of data of the two registers; and XOR exclusive OR of data of the two registers. These operations include transfer of data from a predicate register of predicate register file 234 to another specified predicate register or to a specified data register in global vector register file 231. A commonly expected use of P unit 246 includes manipulation of the SIMD vector comparison results for use in control of a further SIMD vector operation. The BITCNT instruction may be used to count the number of 1's in a predicate register to determine the number of valid data elements from a predicate register.

Still referring to FIG. 2, crosspath 117 permits limited exchange of data between scalar datapath side A 115 and vector datapath side B 116. During each operational cycle one 64-bit data word can be recalled from global scalar register file A 211 for use as an operand by one or more functional units of vector datapath side B 116 and one 64-bit data word can be recalled from global vector register file 231 for use as an operand by one or more functional units of scalar datapath side A 115. Any scalar datapath side A 115 functional unit (L1 unit 221, S1 unit 222, M1 unit 223, N1 unit 224, D1 unit 225 and D2 unit 226) is configured to read a 64-bit operand from global vector register file 231. This 64-bit operand is the least significant bits of the 512-bit data in the accessed register of global vector register file 231. Plural scalar datapath side A 115 functional units are configured to employ the same 64-bit crosspath data as an operand during the same operational cycle. However, only one 64-bit operand is transferred from vector datapath side B 116 to scalar datapath side A 115 in any single operational cycle. Any vector datapath side B 116 functional unit (L2 unit 241, S2 unit 242, M2 unit 243, N2 unit 244, C unit 245 and P unit 246) is configured to read a 64-bit operand from global scalar register file 211. If the corresponding instruction is a scalar instruction, the crosspath operand data is treated as any other 64-bit operand. If the corresponding instruction is a vector instruction, the upper 448 bits of the operand are zero filled. Plural vector datapath side B 116 functional units are configured to employ the same 64-bit crosspath data as an operand during the same operational cycle. Only one 64-bit operand is transferred from scalar datapath side A 115 to vector datapath side B 116 in any single operational cycle.

Streaming engine 125 transfers data in certain restricted circumstances. Streaming engine 125 controls two data streams. A stream consists of a sequence of elements of a particular type. Programs that operate on streams read the data sequentially, operating on each element in turn. Every stream has the following basic properties. The stream data have a well-defined beginning and ending in time. The stream data have fixed element size and type throughout the stream. The stream data have a fixed sequence of elements. Thus, programs cannot seek randomly within the stream. The stream data is read-only while active. Programs cannot write to a stream while simultaneously reading from it. Once a stream is opened, the streaming engine 125: calculates the address; fetches the defined data type from level two unified cache (in some cases, including cache service from a higher level memory); performs data type manipulation such as zero extension, sign extension, data element sorting/swapping such as matrix transposition; and delivers the data directly to the programmed data register file within CPU 110. Streaming engine 125 is thus useful for real-time digital filtering operations on well-behaved data. Streaming engine 125 frees these memory fetch tasks from the corresponding CPU enabling other processing functions.

Streaming engine 125 provides the following benefits. Streaming engine 125 permits multi-dimensional memory accesses. Streaming engine 125 increases the available bandwidth to the functional units. Streaming engine 125 minimizes the number of cache miss stalls since the stream buffer bypasses level one data cache 123. Streaming engine 125 reduces the number of scalar operations to maintain a loop. Streaming engine 125 manages address pointers. Streaming engine 125 handles address generation automatically freeing up the address generation instruction slots and D1 unit 225 and D2 unit 226 for other computations.

CPU 110 operates on an instruction pipeline. Instructions are fetched in instruction packets of fixed length further described below. All instructions entail the same number of pipeline phases for fetch and decode, but entail a varying number of execute phases.

Figure 3:
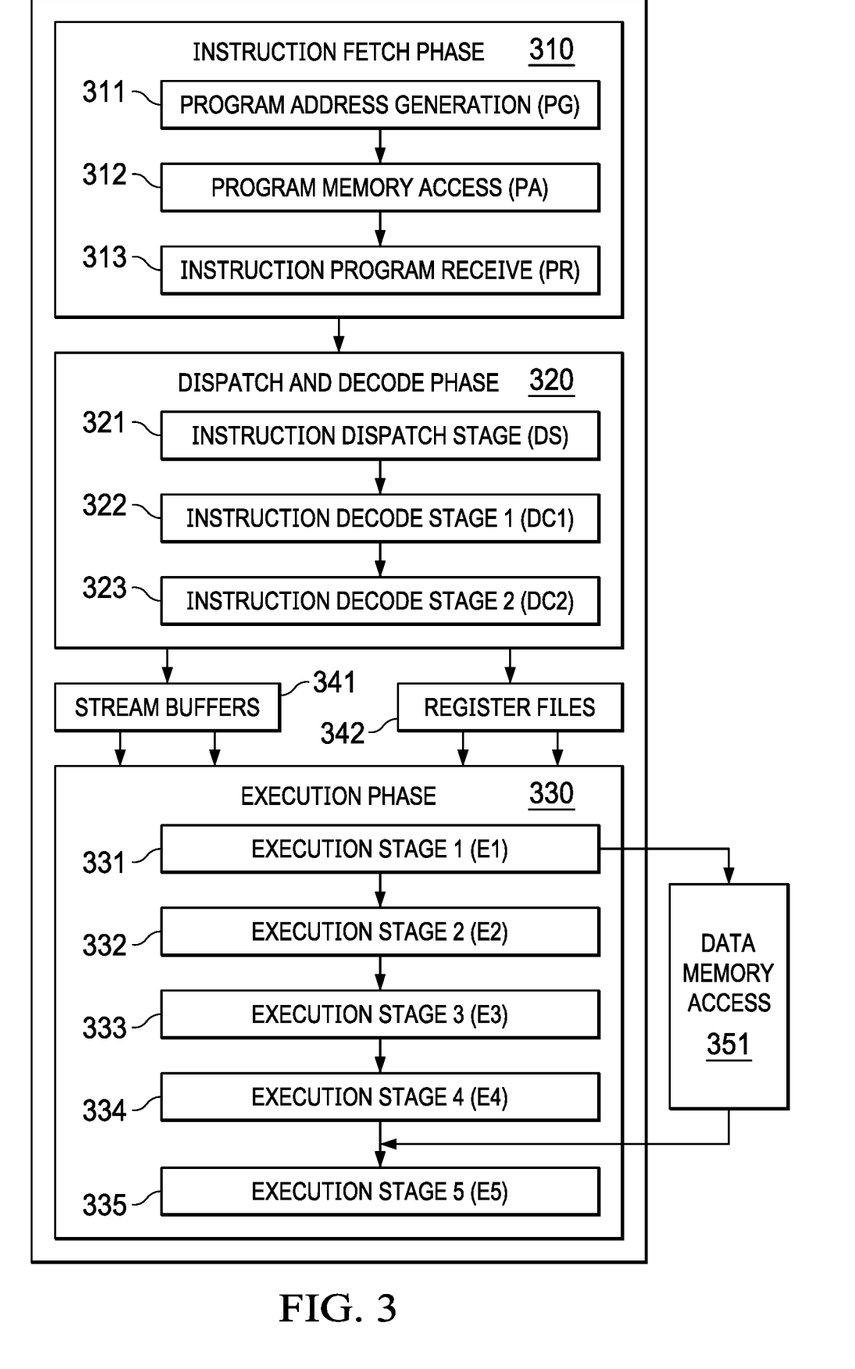
FIG. 3 is a block diagram of pipeline phases of the central processing unit in accordance with various examples.

FIG. 3 is a block diagram that shows the following pipeline phases: program fetch phase 310, dispatch and decode phases 320 and execution phases 330. Program fetch phase 310 includes three stages for all instructions. Dispatch and decode phases 320 include three stages for all instructions. Execution phase 330 includes one to four stages dependent on the instruction.

Fetch phase 310 includes program address generation stage 311 (PG), program access stage 312 (PA) and program receive stage 313 (PR). During program address generation stage 311 (PG), the program address is generated in the CPU and the read request is sent to the memory controller for the level one instruction cache L1I. During the program access stage 312 (PA) the level one instruction cache L1I processes the request, accesses the data in its memory and sends a fetch packet to the CPU boundary. During the program receive stage 313 (PR) the CPU registers the fetch packet.

Figure 4:
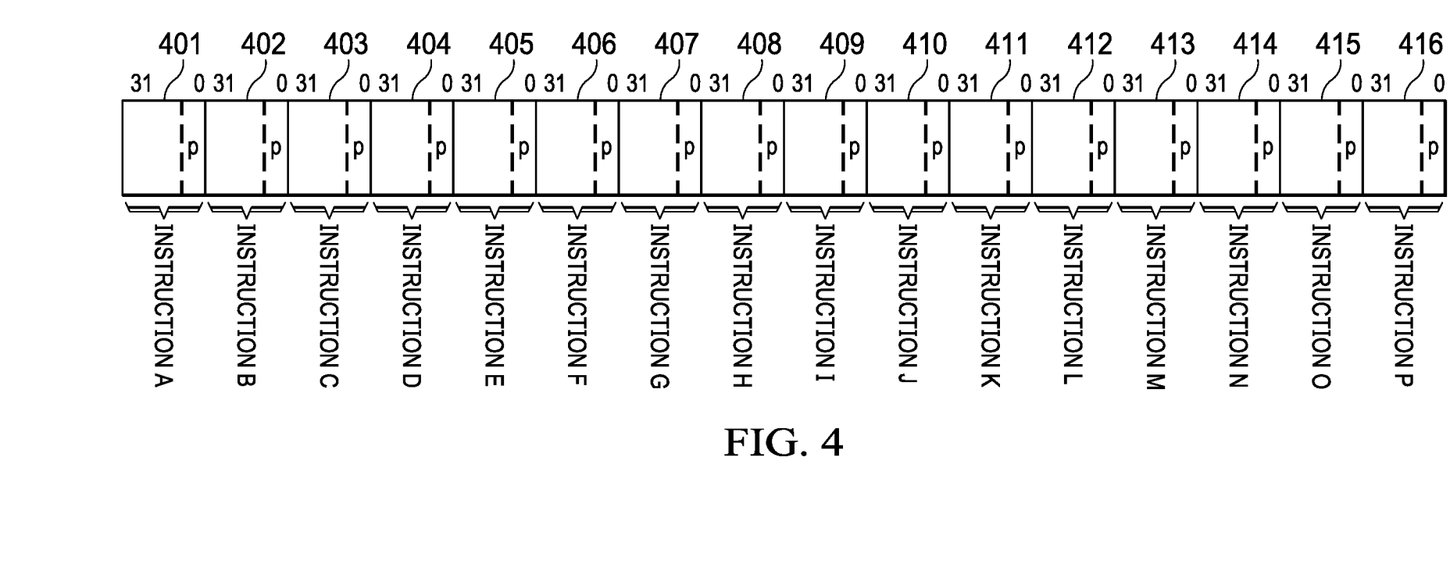
FIG. 4 is an example of a single fetch packet including multiple instructions in accordance with various examples.

In some examples, instructions are fetched as sixteen 32-bit wide slots, constituting a fetch packet, at a time. FIG. 4 illustrates 16 instructions 401 to 416 of a single fetch packet. Fetch packets are aligned on 512-bit (16-word) boundaries. An example employs a fixed 32-bit instruction length. In some examples, fixed-length instructions enable easy decoder alignment. A properly aligned instruction fetch can load plural instructions into parallel instruction decoders. Such a properly aligned instruction fetch can be achieved by predetermined instruction alignment as a result of being stored in memory (e.g., fetch packets aligned on 512-bit boundaries) coupled with a fixed instruction packet fetch. An aligned instruction fetch permits operation of parallel decoders on instruction-sized fetched bits. Variable length instructions entail an initial step of locating each instruction boundary before they can be decoded. A fixed length instruction set generally permits more regular layout of instruction fields. This simplifies the construction of each decoder which is an advantage for a wide issue VLIW central processor.

The execution of the individual instructions is partially controlled by a p bit in each instruction. This p bit is preferably bit 0 of the 32-bit wide slot. The p bit determines whether an instruction executes in parallel with a next instruction. Instructions are scanned from lower to higher address. If the p bit of an instruction is 1, then the next following instruction (higher memory address) is executed in parallel with (in the same cycle as) that instruction. If the p bit of an instruction is 0, then the next following instruction is executed in the cycle after the instruction.

CPU 110 and level one instruction cache L1I 121 pipelines are de-coupled from each other. Fetch packet returns from level one instruction cache L1I can take different number of clock cycles, depending on external circumstances such as whether there is a hit in level one instruction cache 121 or a hit in level two combined cache 130. Therefore program access stage 312 (PA) can take several clock cycles instead of 1 clock cycle as in the other stages.

The instructions executing in parallel constitute an execute packet. In an example, an execute packet can contain up to sixteen instructions (e.g., a fetch packet in which the p bit for each instruction is a 1). In some cases, no two instructions in an execute packet are configured to use the same functional unit. A slot is one of five types: 1) a self-contained instruction executed on one of the functional units of CPU 110 (L1 unit 221, S1 unit 222, M1 unit 223, N1 unit 224, D1 unit 225, D2 unit 226, L2 unit 241, S2 unit 242, M2 unit 243, N2 unit 244, C unit 245 and P unit 246); 2) a unitless instruction such as a NOP (no operation) instruction or multiple NOP instruction; 3) a branch instruction; 4) a constant field extension; and 5) a conditional code extension. Some of these slot types will be further explained below.

Dispatch and decode phases 320 include instruction dispatch to appropriate execution unit stage 321 (DS), instruction pre-decode stage 322 (DC1); and instruction decode, operand reads stage 323 (DC2). During instruction dispatch to appropriate execution unit stage 321 (DS), the fetch packets are split into execute packets and assigned to the appropriate functional units. During the instruction pre-decode stage 322 (DC1), the source registers, destination registers and associated paths are decoded for the execution of the instructions in the functional units. During the instruction decode, operand reads stage 323 (DC2), more detailed unit decodes are done, as well as reading operands from the register files.

Execution phases 330 include execution stages 331 to 335 (E1 to E5). Different types of instructions entail different numbers of these stages to complete their execution. These stages of the pipeline play an important role in understanding the device state at CPU cycle boundaries.

During execute 1 stage 331 (E1) the conditions for the instructions are evaluated and operands are operated on. As illustrated in FIG. 3, execute 1 stage 331 may receive operands from a stream buffer 341 and one of the register files shown schematically as 342. For load and store instructions, address generation is performed and address modifications are written to a register file. For branch instructions, branch fetch packet in PG phase is affected. As illustrated in FIG. 3, load and store instructions access memory here shown schematically as memory 351. For single-cycle instructions, results are written to a destination register file. This assumes that any conditions for the instructions are evaluated as true. If a condition is evaluated as false, the instruction does not write any results or have any pipeline operation after execute 1 stage 331.

During execute 2 stage 332 (E2) load instructions send the address to memory. Store instructions send the address and data to memory. Single-cycle instructions that saturate results set the SAT bit in the control status register (CSR) if saturation occurs. For 2-cycle instructions, results are written to a destination register file.

During execute 3 stage 333 (E3) data memory accesses are performed. Any multiply instructions that saturate results set the SAT bit in the control status register (CSR) if saturation occurs. For 3-cycle instructions, results are written to a destination register file.

During execute 4 stage 334 (E4) load instructions bring data to the CPU boundary. For 4-cycle instructions, results are written to a destination register file.

During execute 5 stage 335 (E5) load instructions write data into a register. This is illustrated schematically in FIG. 3 with input from memory 351 to execute 5 stage 335.

As explained above, the completion of various data movement or data processing operations can be signaled by triggering an event. However, interrupting running tasks to launch an event handler task that handles such events is a time-consuming process. A ping pong buffering technique is one example that implicates such a data movement operation. In a ping pong buffering technique, during a first period of time, a memory engine (e.g., a direct memory access (DMA) engine) transfers data into (or out of) a first buffer while a task (e.g., a user task executed by a data processor core) operates on or manipulates data in a second buffer. Then, when both the DMA engine and user task activity completes, the DMA engine and user task switch to the other of the buffers. For example, during a second period of time, the DMA engine transfers data into (or out of) the second buffer while the user task operates on or manipulates data in the first buffer. Thus, it is advantageous for the user task to be able to determine when the DMA engine has finished transferring data to/from the other buffer without having to rely on an event handler task to handle an event that indicates that the DMA engine has finished transferring data to/from the other buffer.

Figure 5:
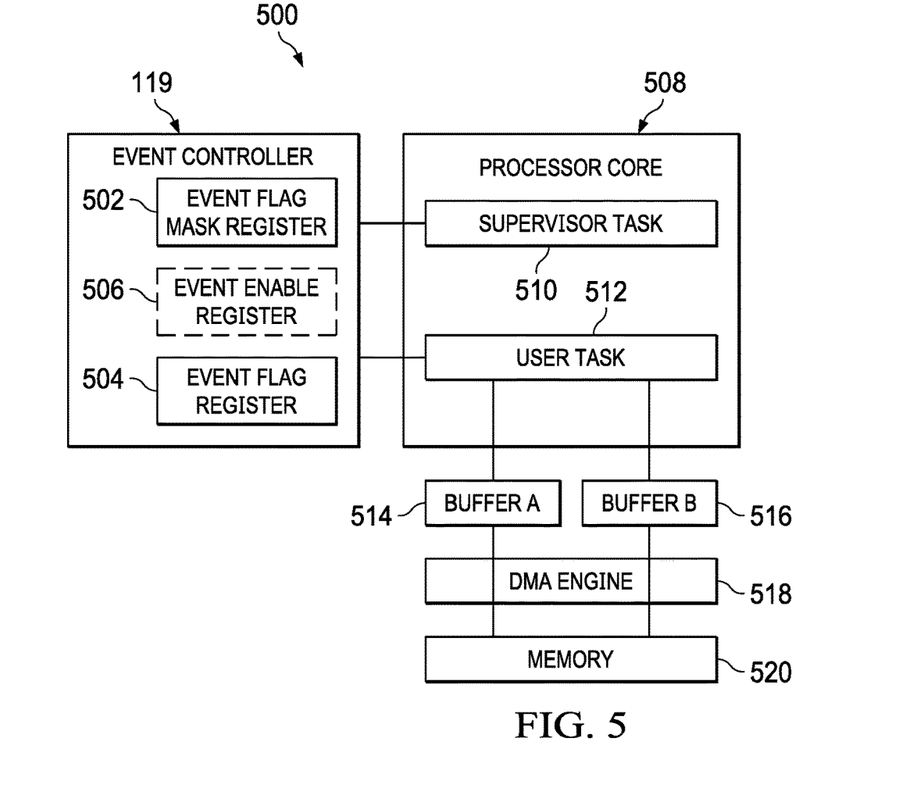
FIG. 5 is a block diagram showing an event controller in accordance with various examples.

FIG. 5 is a block diagram of a system 500 for such user mode event handling. The system 500 includes event controller 119, described above with respect to FIG. 1. In examples of this description, the event controller 119 is configured to perform various functionality related to the handling, processing, or disposition of events. As explained above, events include both exceptions and interrupts. In the example of FIG. 5, the event controller 119 includes an event flag mask register 502, an event flag register 504, and an event enable register 506.

The system 500 also includes a processor core 508, which is configured to execute a supervisor task 510 and a user task 512, In FIG. 5, the processor core 508 and the event controller 119 are shown as separate entities for ease of discussion of their respective functionality. However, in other examples (e.g., as shown in FIG. 1), the event controller 119 is part of the processor core 508, although the processor core 508 is additionally configured to execute the supervisor task 510 and the user task 512 independently of, but in conjunction with, the event controller 119. In an example, the supervisor task 510 and the user task 512 differ in that the supervisor task 510 has a greater priority and/or permission level relative to the user task 512. As a result of having a greater priority and/or permission level, the supervisor task 510 is configured to perform certain functionality in the system 500 that the user task 512 is not permitted to perform.

As described further below, the user task 512 is configured to process or manipulate data in a first buffer A 514 and a second buffer B 516 using the ping pong buffering technique described above. A DMA engine 518 facilitates transfer of data between buffer A 514 and a memory 520, as well as between buffer B 516 and the memory 520.

As described above, the completion of a data movement operation (e.g., from the memory 520 into one of buffer A 514 and buffer B 516) can be signaled (e.g., to the user task 512) by the triggering of an event. In the example of FIG. 5, it is assumed for simplicity that the event flag mask register 502, the event flag register 504, and the event enable register 506 are thus associated with this event. However, as described further below with respect to FIG. 6, in other implementation examples, this event is one of multiple possible events, and thus one lane of each of the registers 502, 504, 506 (e.g., including one field of each of the registers 502, 504, 506) is associated with this event.

Referring to the specific example of FIG. 5, the triggering of this event results in the event flag register 504 being asserted, regardless of whether the event is handled or, as described below, disabled. Prior to the user task 512 beginning to operate on data in buffer A 514 or buffer B 516, the supervisor task 510 is configured to disable the event (e.g., inhibiting an event handler task or otherwise preventing the event from automatically interrupting a running task to launch an event handler task). In one example, the supervisor task 510 is configured to disable the event by de-asserting the event enable register 506. In another example, the event is disabled responsive to the event flag mask register 502 being asserted, and thus the event enable register 506 may not be utilized in this example. The use of a separate enable register 506 provides the flexibility to independently enable/disable events regardless of whether a user task 512 is permitted to modify the event flag register 504 (e.g., responsive to the event flag mask register 502 being asserted). However, for implementations in which the event is only disabled when the user task 512 is permitted to modify the event flag register 504, the event controller 119 is simplified by not implementing the event enable register 506 and instead disabling the event responsive to the event flag mask register 502 being asserted. In either example, a request by the user task 512 (e.g.; having a lower priority than the supervisor task 510) to disable any event is rejected by the event controller 119.

Also prior to the user task 512 beginning to operate on data in buffer A 514 or buffer B 516, the supervisor task 510 is configured to, in addition to disabling the event, assert the event flag mask register 504. When asserted, the event flag mask register 504 enables the user task 512 to read and/or clear the event flag register 504.

As described above, when the event occurs responsive to the completion of a data movement operation (e.g., from the memory 520 into one of buffer A 514 and buffer B 516), the event does not launch an event handler task due to the event having been disabled by the supervisor task 510. However, the event flag register 504 is asserted, indicating the occurrence of the event to the user task 512. The user task 512 is configured to poll (e.g., read) the event flag register 504 to determine when the data movement operation from memory 520 to one of buffer A 514 and buffer B 516 is complete without the overhead of the event handler task. Responsive to the indication that the data movement operation is complete, the user task 512 is thus configured to begin operating on the resulting data. Additionally, the user task 512 is also configured provide a request to the event controller 119 to clear (e.g., de-assert) the event flag register 504. Responsive to the event flag mask register 502 being asserted, the event controller 119 is configured to grant the request to clear the event flag register 504. However, responsive to the event flag mask register 502 being de-asserted, the event controller 119 is configured to deny the request to clear the event flag register 504, and thus does not clear the event flag register 504.

As a result, the user task 512 is configured to determine when the data movement or data processing operation is complete (e.g., by polling the event flag register 504) while avoiding the overhead associated with the event handler task. The user task 512 then begins to operate on the data resulting from the data movement or data processing operation. Further, the user task 512 is configured to request to clear the event flag register 512, and the event controller 119 is configured to grant such request because the event flag mask register 502 is asserted.

As explained above, the ping pong buffering technique is one example in which the event controller 119 described above reduces overhead by avoiding interrupting a running task to launch an event handler task while still providing the functionality of the event (e.g., alerting the user task 512 that a condition has occurred). For example, it is assumed that the supervisor task 510 has already requested, and the event controller 119 granted such request, to assert the event flag mask register 502 and to disable the event (either by asserting the event enable register 506 or by virtue of the event flag mask register 502 being asserted).

After the event flag mask register 502 has been asserted, the user task 512 is configured to begin processing data in the first buffer A 514 during a first time period. Also during the first time period, the DMA engine 518 facilitates transfer of data from memory 520 into the second buffer B 516.

Responsive to the user task 512 processing of data in buffer A 514 being complete, the user task 512 is configured to read or poll the event flag register 504, which is associated with the event triggered when movement of data from memory 520 into buffer B 516 is complete. If the event flag register 504 is not set or asserted, the user task 512 is configured to continue to read the event flag register 504. If the event flag register 504 is set or asserted (e.g., indicating that the DMA engine 518 has completed facilitating transfer of data from memory 520 to buffer B 516), the user task 512 is configured to provide a request to the event controller 119 to clear the event flag register 504. The event controller 119 is configured to clear the event flag register 504 responsive to receiving such a request provided that the event flag mask register 502 is asserted.

Subsequent to the user task 512 clearing the event flag register 504, the user task 512 is configured to begin processing or manipulating the data in buffer B 516 during a second time period. Also during the second time period, the DMA engine 518 facilitates transfer of data from memory 520 into buffer A 514.

Responsive to the user task 512 processing of data in buffer B 516 being complete, the user task 512 is configured to again read or poll the event flag register 504. The event is also triggered when movement of data from memory 520 into buffer A 514 is complete. Thus, if the event flag register 504 is not set or asserted, the user task 512 is configured to continue to read the event flag register 504. If the event flag register 504 is set or asserted (e.g., indicating that the DMA engine 518 has completed facilitating transfer of data from memory 520 to buffer A 514), the user task 512 is configured to provide a request to the event controller 119 to clear the event flag register 504. The event controller 119 is configured to clear the event flag register 504 responsive to receiving such a request provided that the event flag mask register 502 is asserted.

In other examples, the above-described process continues, with the event being triggered (and thus the event flag register 504 being asserted) when the DMA engine 518 completes facilitating transfer of data to either buffer A 514 or buffer B 516 from memory 520. Thus, by polling the event flag register 504 upon completing processing data in one of the buffers 514, 516, the user task 512 is aware of when the data transfer to the other of the buffers 516, 514 is complete, and thus ready to be processed by the user task 512. However, because the event is disabled, the event controller 119 may be prevented from handling the event by launching an event handler, and thus the overhead associated with the event controller 119 handling the event is reduced.

Figure 6:
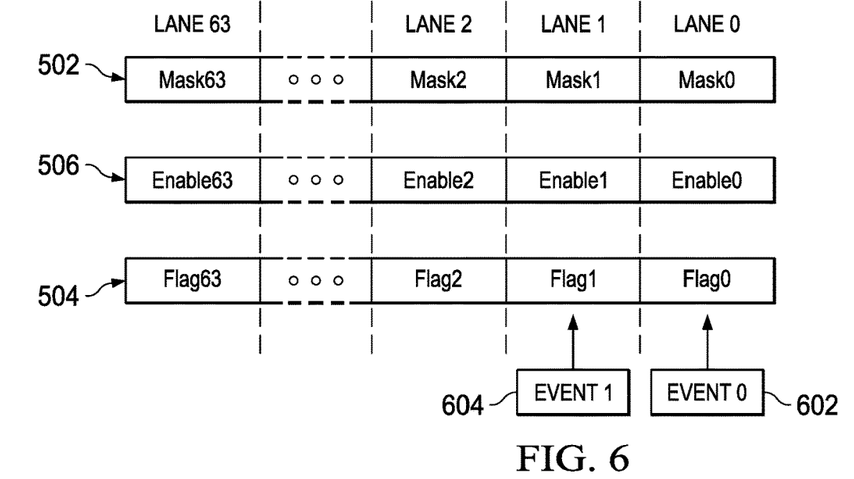
FIG. 6 is a schematic diagram of an event flag mask register, an event flag register, and an event enable register in accordance with various examples.

As explained above, in other implementation examples, this event is one of multiple possible events, and thus one lane of each of the registers 502, 504, 506 (e.g., including one field of each of the registers 502, 504, 506) is associated with this event. FIG. 6 is a schematic diagram of the event flag mask register 502, the event flag register 504, and the event enable register 506 in accordance with an example of this description. In FIG. 6, a field of the event flag mask register 502 has a corresponding field in the event flag register 504 and in the event enable register 506. The corresponding fields of the registers 502, 504, 506 form a lane, which is associated with a particular event.

FIG. 6 is a schematic diagram of the event flag mask register 502, the event flag register 504, and the event enable register 506 in accordance with various examples. In the example of FIG. 6, each of the registers 502, 504, 506 include multiple fields (e.g., 64 fields as shown). In this example, each of the registers 502, 504, 506 are divided into lanes labeled Lane 0 through Lane 63, and fields in the registers 502, 504, 506 that are in the same lane are said to correspond with one another. The fields in the same lane correspond with one another regardless of the size of the field. For example, the Mask0 field of the event flag mask register 502, the Flag0 field of the event flag register 504, and the Enable0 field of the event enable register 506 all correspond with one another by virtue of all being in Lane 0.

In some examples, each of the lanes of the registers 502, 504, 506 are associated with a different type of event. For example, as shown, Event 0 602 is associated with Lane 0, while other types of events may be associated with the remaining lanes. In an example, the completion of a data movement or data processing operation is indicated to different user tasks by a different event number. For example, the completion of data operation is indicated to a first user task by Event 0 602 (and is handled with the fields of the registers 502, 504, 506 in Lane 0 as described above). The completion of a data operation is indicated to a second user task such as by another Event 1 604 (and is handled with the fields of the registers 502, 504, 506 in Lane 1 as described above). As a result, responsive to the processor core 508 switching from executing a first user task to executing a second user task, both of which may rely on awareness of the completion of data movement or data processing operations, the processor core 508 is configured to de-assert the event flag mask register 502 field associated with the first user task (e.g., Mask0) and to assert the event flag mask register 502 field associated with the second user task (e.g., Mask1). As a result, the second user task is unable to clear the event flag register 504 field associated with the first user task (e.g., Flag0) because Mask0 is de-asserted. Similarly, when the first user task is executed, the first user task is unable to clear the event flag register 504 field associated with the second user task (e.g., Flag1) because Mask1 is de-asserted.

Figure 7:
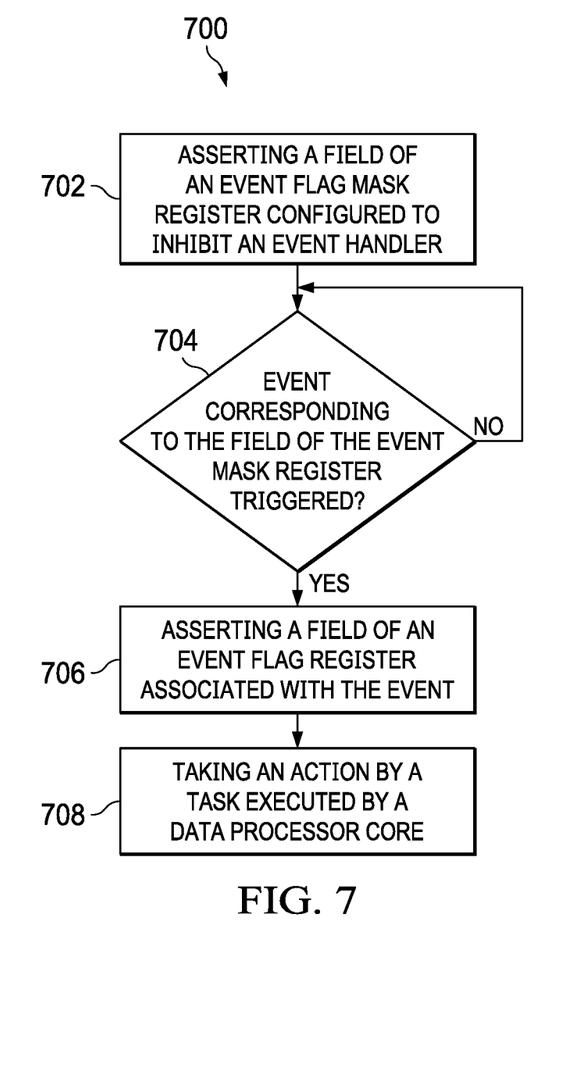
FIG. 7 is a flow chart of a method for user mode event handling in accordance with various examples.

FIG. 7 is a flow chart of a method 700 for user mode event handling in accordance with examples of this description. The method 700 begins in block 702 with asserting a field of an event flag mask register 502. As described above, in some examples, an event is disabled (e.g., an event handler task is inhibited or otherwise prevented from automatically interrupting a running task to launch an event handler task) responsive to the event flag mask register 502 being asserted.

The method 700 continues in block 704 in which it is determined whether an event corresponding to the asserted field of the event flag mask register 502 has been triggered. For example, the event may be triggered responsive to the completion of a data movement operation (e.g., from the memory 520 into one of buffer A 514 and buffer B 516), although the event does not launch an event handler task due to the event having been disabled by the supervisor task 510.

The method 700 remains in block 704 until the event corresponding to the asserted field of the event flag mask register 502 has been triggered, at which point the method 700 continues to block 706. In block 706, the method includes asserting a field of the event flag register 504 in response to the occurrence of the event being triggered. In an example, the user task 512 is configured to poll (e.g., read) the event flag register 504 to determine whether the event has been triggered.

The method 700 then continues to block 708 with taking an action by a task (e.g., the user task 512) executed by the processor core 508. For example, the user task 512 is configured to determine when a data movement or data processing operation is complete (e.g.; by polling the event flag register 504) while avoiding the overhead associated with the event handler task. The user task 512 then begins to operate on the data resulting from the data movement or data processing operation. Further, the user task 512 is configured to request to clear the event flag register 512, and the event controller 119 is configured to grant such request because the event flag mask register 502 is asserted.

In the foregoing discussion and in the claims, the terms "including" and "comprising" are used in an open-ended fashion, and thus mean "including, but not limited to . . . "

The term "couple" is used throughout the specification. The term may cover connections, communications, or signal paths that enable a functional relationship consistent with the description of the present disclosure. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

An element or feature that is "configured to" perform a task or function may be configured (e.g., programmed or structurally designed) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof. Additionally, uses of the phrases "ground" or similar in the foregoing discussion include a chassis ground, an Earth ground, a floating ground, a virtual ground, a digital ground, a common ground, and/or any other form of ground connection applicable to, or suitable for, the teachings of the present disclosure. Unless otherwise stated, "about," "approximately," or "substantially" preceding a value means +/−10 percent of the stated value.

The above discussion is illustrative of the principles and various embodiments of the present disclosure. Numerous variations and modifications will become apparent to those skilled in the art once the above disclosure is fully appreciated. The following claims should be interpreted to embrace all such variations and modifications.

What is claimed is:

1. A method, comprising:
    asserting a field of an event flag mask register configured to inhibit an event handler; and
    responsive to an event that corresponds to the field of the event flag mask register being triggered:
        asserting a field of an event flag register associated with the event;
        based on the field in the event flag register being asserted, performing an action by a task being executed by a data processor core;
        receiving a request from the task to clear the field in the event flag register; and
        clearing the field responsive to the action, the field of the event flag mask register being asserted, and the request to clear the field.

2. The method of claim 1, wherein the task comprises a user task.

3. The method of claim 1, further comprising asserting the field of the event flag mask register responsive to a request from a supervisor task.

4. The method of claim 1, further comprising:
    responsive to asserting the field of the event flag mask register:
        processing, by the task, data contained in a first buffer;
        transferring data from a memory to a second buffer while processing data in the first buffer; and
        responsive to the transfer from the memory to the second buffer being complete, triggering the event.

5. The method of claim 4, further comprising:
responsive to processing data in the first buffer being complete, reading, by the task, the field in the event flag register associated with the event;
responsive to the field in the event flag register being asserted, requesting, by the task, to clear the field in the event flag register; and
responsive to the field in the event flag register not being asserted, continuing to read, by the task, the field in the event flag register.

6. The method of claim 5, wherein the event is a first event, the method further comprising:
responsive to the field in the event flag register being asserted and subsequently cleared:
processing, by the task, data contained in the second buffer;
transferring data from the memory to the first buffer while processing data in the second buffer; and
responsive to the transfer from the memory to the first buffer being complete, triggering a second event.

7. The method of claim 1, further comprising, responsive to asserting the field of the event flag mask register, preventing an event controller from handling events associated with the asserted field of the event flag mask register.

8. A method, comprising:
receiving a request, from a supervisor task executed by a data processor core, to assert a field of an event flag mask register;
responsive to the request from the supervisor task, asserting the field of the event flag mask register;
responsive to an event being triggered, asserting a field of an event flag register associated with the event;
receiving a request from a user task executed by the data processor core to clear the asserted field of the event flag mask register;
responsive to the field of the event flag register corresponding to the asserted field of the event flag mask register, clearing the asserted field of the event flag mask register; and
responsive to the field of the event flag register not corresponding to the asserted field of the event flag mask register, not clearing the asserted field of the event flag mask register.

9. The method of claim 8, further comprising:
responsive to asserting the field of the event flag mask register:
processing, by the user task, data contained in a first buffer;
transferring data from a memory to a second buffer while processing data in the first buffer; and
responsive to the transfer from the memory to the second buffer being complete, triggering the event.

10. The method of claim 9, further comprising:
responsive to processing data in the first buffer being complete, reading, by the user task, the field in the event flag register associated with the event;
responsive to the field in the event flag register being set, requesting, by the user task, to clear the asserted field of the event flag mask register; and
responsive to the field in the event flag register not being set, continuing to read, by the user task, the field of the event flag register.

11. The method of claim 10, wherein the event is a first event, the method further comprising:
responsive to the field in the event flag register being set and subsequently cleared:
processing, by the user task, data contained in the second buffer;
transferring data from the memory to the first buffer while processing data in the second buffer; and
responsive to the transfer from the memory to the first buffer being complete, triggering a second event.

12. The method of claim 8, further comprising, responsive to asserting the field of the event flag mask register, preventing an event controller from handling events associated with the asserted field of the event flag mask register.

13. The method of claim 12, wherein a field of an event enable register corresponds to the asserted field of the event flag mask register, the method further comprising:
responsive to the field of the event enable register being de-asserted, preventing the event controller from handling events associated with the asserted field of the event flag mask register; and
responsive to the field of the event enable register being asserted, permitting the event controller to handle events associated with the asserted field of the event flag mask register.

14. A system, comprising:
a data processor; and
an event controller coupled to the data processor, the event controller comprising:
an event flag mask register having a plurality of fields each configured to inhibit an event handler; and
an event flag register having a plurality of fields, wherein each one of the plurality of fields of the event flag register corresponds to one of the plurality of fields of the event flag mask register; and
wherein the event controller is configured to:
receive a request from a supervisor task to assert a field of the event flag mask register;
responsive to the request from the supervisor task, assert the field of the event flag mask register;
responsive to an event being triggered, assert a field of the event flag register associated with the event;
receive a request from a user task to clear the field of the event flag register;
responsive to the field of the event flag register corresponding to the asserted field of the event flag mask register, clear the field of the event flag register; and
responsive to the field of the event flag register not corresponding to the asserted field of the event flag mask register, not clear the field of the event flag register.

15. The system of claim 14, wherein the data processor is configured to execute the supervisor task and to execute the user task.

16. The system of claim 14, wherein, responsive to asserting the field of the event flag mask register:
the user task is configured to process data contained in a first buffer;
data is transferred from a memory to a second buffer while the user task processes data in the first buffer; and
the event is triggered responsive to the transfer from the memory to the second buffer being complete.

17. The system of claim 16, wherein the user task is further configured to:
responsive to processing data in the first buffer being complete, read the field in the event flag register associated with the event;
responsive to the field in the event flag register being asserted, request to clear the asserted field of the event flag mask register; and responsive to the field in the event flag register not being set, continue to read the asserted field of the event flag mask register.

18. The system of claim 17, wherein:

the event is a first event; and responsive to the field in the event flag register being asserted and subsequently cleared:
- the user task is configured to process data contained in the second buffer;
- data is transferred from the memory to the first buffer while the user task processes data in the second buffer; and
- a second event is triggered responsive to the transfer from the memory to the first buffer being complete.

19. The system of claim 14, further comprising, responsive to asserting the field of the event flag mask register, preventing an event controller from handling events associated with the asserted field of the event flag mask register.

\* \* \* \* \*